June 27, 1939.   D. R. STAPLES   2,163,895
ENGINE SPEED AND REVERSE CONTROL
Filed March 26, 1937
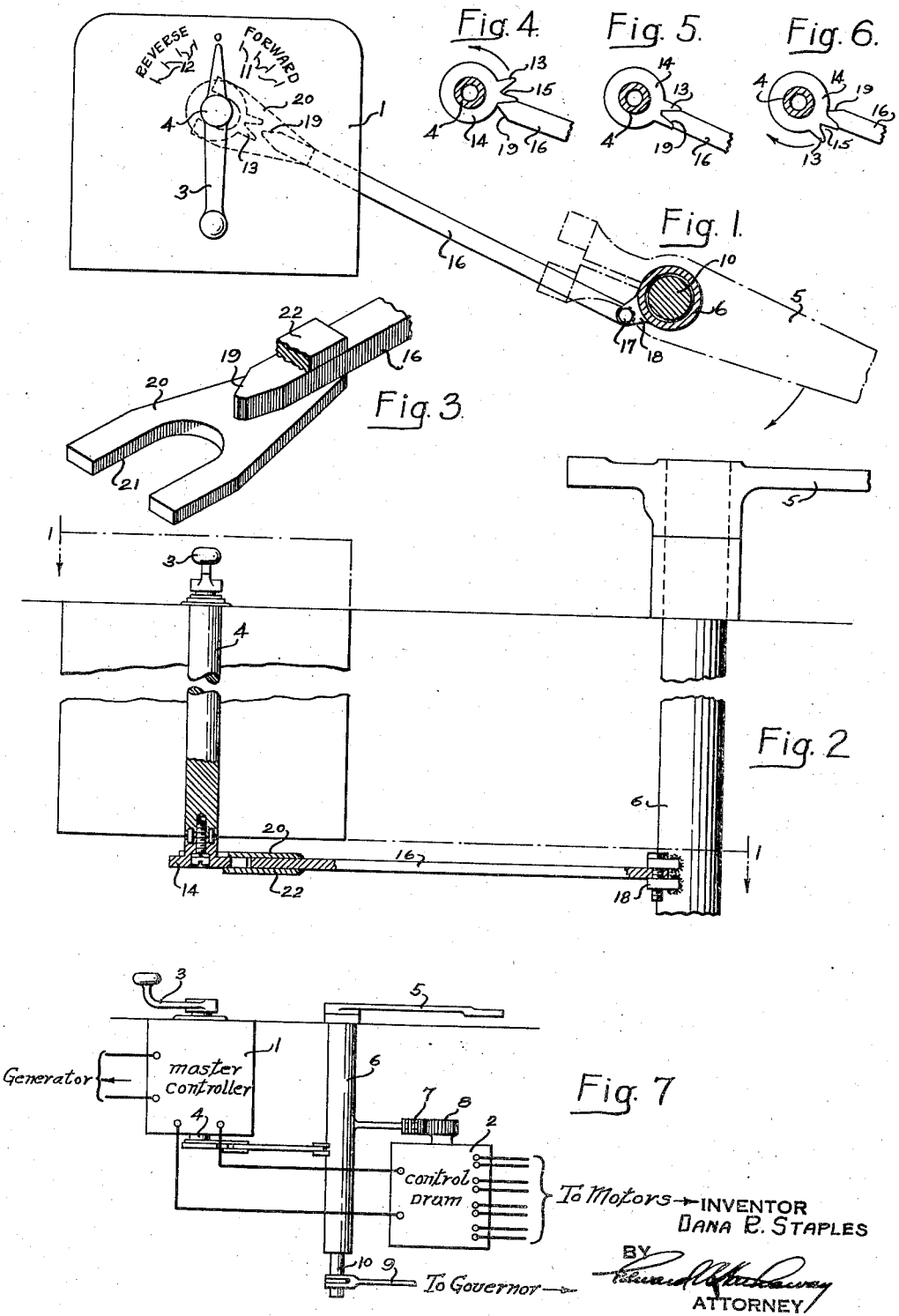

Patented June 27, 1939

2,163,895

UNITED STATES PATENT OFFICE 2,163,895

ENGINE SPEED AND REVERSE CONTROL

Dana R. Staples, Ridley Park, Del.

Application March 26, 1937, Serial No. 133,192

4 Claims. (Cl. 74—483)

This invention relates generally to mechanical interlocking apparatus and more particularly to a mechanical interlock between a master controller and speed control lever for an internal combustion engine electric locomotive.

Various interlocking systems have heretofore been proposed and used in internal combustion engine locomotives such as of the Diesel type but they are either complicated in structure or limited in their flexibility of operation.

It is an object of my invention to provide an improved mechanical interlock between a master control reversing lever and an engine speed control lever. Another object is to provide such an improved interlock that will permit maximum flexibility of operation both as to controlling the engine speed and in effecting a variable field excitation for the driving motors in either forward or reverse directions but preventing the master control being shifted from forward to reverse or vice versa except when the engine is idling.

A further object is to provide a control of the above type that is relatively simple and economical in manufacture, maintenance and operation, is rugged and compact, and positive and foolproof in operation.

Other objects and advantages will be more apparent to those skilled in the art from the following description of the accompanying drawing in which:

Fig. 1 is a diagrammatic plan view of the interlock between a master control lever and a portion of the speed control lever shaft, taken substantially on the line 1—1 of Fig. 2;

Fig. 2 is an elevation of Fig. 1 with a portion of the interlock shown in section;

Fig. 3 is a partial perspective view of the shiftable interlocking element turned over to observe the bottom side thereof;

Figs. 4, 5 and 6 are diagrammatic plan views showing the relative relation of the cooperating interlocking elements in their three possible general positions;

Fig. 7 is a diagrammatic side elevation showing the application of the interlocking system to an electrical control apparatus.

In the particular embodiment of the invention such as is disclosed herein merely for the purpose of illustrating one specific form among possible others that the invention might take in practice, there is shown in Fig. 7 a master controller 1 adapted to connect, either for forward or reverse operation, the driving motors (not shown) of a locomotive such as of the Diesel electric type. A control drum 2 for varying usual resistances in the motor circuit is suitably electrically connected to the master controller both of which are of any usual and well-known type of construction. Inasmuch as their specific constructions do not constitute a part of my present invention, further description thereof is not necessary except to point out that the master controller is normally operated by a control lever 3 secured to a shaft 4 while the control drum is operated by a speed control lever 5 through a shaft 6, arcuate gear 7 secured to shaft 6 and a pinion 8. A usual governor adjusting control link 9 for setting the engine speed is connected to a shaft 10 which for purposes of this application may be considered as connected to shaft 6 for simultaneous rotation therewith. Operation of lever 5 adjusts a governor (not shown) in a usual manner to vary the speed of the engine, and hence lever 5 is referred to as a speed control lever which has an idling position shown in the dot-dash line of Fig. 1 and is movable clockwise to increase the engine speed.

The master control lever 3 is shown in its off position in Fig. 1 but may be shifted counterclockwise for reverse operation and clockwise for forward operation. In either one of these directions, there are several intermediate positions 11 or 12 for variably controlling the field excitation of the driving motors and thereby controlling the locomotive speed for any given engine speed.

My improved interlock comprises a two prong member 13 formed on a collar 14 which is secured to shaft 4, the prongs 13 being provided with a V notch 15. A horizontal link 16 is pivotally connected at 17 to an arm 18 which in turn is secured to shaft 6 while the other end of said link has a V-shaped end 19. Rigidly secured to the top surface of link 16 is a combined guiding and supporting extension 20 provided with a guide opening 21 through which shaft 4 extends. The extended fingers of guide 20 rest on top of collar 14 while a keeper strip 22, Fig. 2, is secured to the under side of link 16 and extends beneath collar 14. Fig. 3 is a perspective of these various elements turned upside down for purposes of clarity.

*Operation.*—When the engine is idling, speed control lever 5 is in the position shown in Fig. 1 and stop element 19 is withdrawn from the path of rotation of prongs 13. The master control lever 3 may now be initially moved to its forward or reverse positions as may be desired without imparting any movement to the locomotive inasmuch as the engine is maintained at an idling speed. After the master control lever is moved, say to its forward position, the speed control lever is moved clockwise, Fig. 1, from its idling position shown, thereby simultaneously moving link 16 and its stop element 19 inwardly so as to overlap one of the prongs 13 as shown in Fig. 6 and to operate control drum 2 through gears 7 and 8 together with operation of the governor linkage 9 to increase the engine speed through usual adjustment of a usual fuel pump. As seen in Fig. 6, control lever 3 cannot now be moved to its reverse position as prongs 13 will engage element 19 which in turn is adequately supported against lateral displacement by virtue of guide 20 and the slidable opening 21 thereof engaging the sides of shaft 4. However, master control lever 3 can be moved through its successive speed positions 11. Also, the speed control lever 5 may be moved clockwise through the full range of engine speeds while still maintaining the stop element 19 in overlapping relation to the path of movement of prongs 13, this being possible by reason of arm 18, Fig. 1, being of relatively short radius so that shaft 6 may rotate through its full angularity with limited reciprocating movement of link 16. To reverse the locomotive, the operator must first return speed lever 5 to its idling position in order to withdraw stop element 19 from the path of prongs 13, whereupon the control lever 3 may be rotated counterclockwise to a reverse position shown in Fig. 4. Thereafter speed lever 5 may be operated to any extent desired without any possibility of lever 3 being thrown to the forward position while the engine is generating propelling power. To test the engine speed, control lever 3 is moved to its zero position and speed lever 5 is then moved clockwise, Fig. 1, to any desired extent. During such operation, stop element 19 is moved into V recess 15 between the prongs thereby preventing control lever 3 from being moved to either its forward or reverse positions. Hence there is no danger of the driving motors being suddenly connected while the engine is operating under its test speed.

From the foregoing disclosure, it is seen that I have provided an extremely simple and yet highly effective interlock between the engine speed control and reversing levers that is positive and foolproof in operation, and is rugged and compact while still permitting maximum flexibility of control of the engine speed and control drum as well as the motor field excitation for controlling the motor speed. Briefly these advantages are accomplished by the provision of cooperating mechanical elements such as the rotatable mechanical prong elements 13 and the reciprocable element 16 so arranged that after master control lever 3 is moved in either one of opposite directions from an intermediate "off" position or when the lever 3 is in its "off" position, then speed control lever 5 can be moved from its given or idling position to effect the interlock, but under no circumstances is the lever 3 thereafter permitted to move from one of its positions to another until the speed lever is first returned to idling position.

It will of course be understood that various changes in details of construction and arrangement of parts may be made by those skilled in the art without departing from the spirit of the invention as set forth in the appended claims.

I claim:

1. In combination, a control lever normally movable in one direction from a given position, a second lever normally movable in opposite directions from an off position to operating positions, and means for mechanically interlocking said levers whereby said first lever may be moved away from its given position when said second lever is in any one of its positions but after said first lever is moved then said second lever is inhibited from moving from an operating position to an off position although both of said levers are otherwise independently movable subject only to said inhibition.

2. The combination set forth in claim 1 further characterized in that said mechanical interlocking means includes a rotatable pair of spaced prongs operatively connected to one of said levers and a reciprocable member operatively associated with the other of said members, said reciprocable member being adapted to be moved between said prongs to prevent rotation thereof or to be moved into the path of rotation of one or the other of said prongs on the outer sides thereof whereby said prongs and the lever associated therewith may be thereafter rotated in only one direction.

3. In combination, an engine speed control lever, a master control lever having forward and reverse positions with an intermediate off position, means for mechanically interlocking said levers whereby said master lever may be locked in its off position while permitting said speed control lever to be operated, and means whereby said master lever is adapted to be initially moved in either direction from its off position and thereafter be inhibited from returning thereto when said speed control lever is initially moved but otherwise allowing both levers to be independently movable subject only to said inhibition.

4. The combination set forth in claim 3 further characterized by the provision of a control drum operated simultaneously with movement of said speed control lever.

DANA R. STAPLES.